United States Patent
Lee et al.

(10) Patent No.: US 12,323,533 B2
(45) Date of Patent: Jun. 3, 2025

(54) APPARATUS AND METHOD FOR DISTRIBUTED CONSENSUS IN DYNAMIC BYZANTINE FRACTION ENVIRONMENT

(71) Applicant: ELECTRONICS AND TELECOMMUNICATIONS RESEARCH INSTITUTE, Daejeon (KR)

(72) Inventors: Changhyun Lee, Daejeon (KR); Jintae Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 220 days.

(21) Appl. No.: 17/981,640

(22) Filed: Nov. 7, 2022

(65) Prior Publication Data
US 2023/0188359 A1    Jun. 15, 2023

(30) Foreign Application Priority Data
Dec. 15, 2021  (KR) .................. 10-2021-0179676

(51) Int. Cl.
*H04L 9/32* (2006.01)
*G06F 17/18* (2006.01)
*H04L 9/00* (2022.01)

(52) U.S. Cl.
CPC .......... *H04L 9/3247* (2013.01); *G06F 17/18* (2013.01); *H04L 9/50* (2022.05)

(58) Field of Classification Search
CPC .................. H04L 9/3247; H04L 9/50
USPC ........................................... 713/176
See application file for complete search history.

(56) References Cited

U.S. PATENT DOCUMENTS

| | | | |
|---|---|---|---|
| 11,343,073 | B2 | 5/2022 | Oh et al. |
| 2019/0327084 | A1 | 10/2019 | Oh et al. |
| 2019/0379538 | A1 | 12/2019 | Oh et al. |

FOREIGN PATENT DOCUMENTS

| | | |
|---|---|---|
| KR | 10-2020-0117530 | 10/2020 |
| KR | 10-2020-0144466 | 12/2020 |
| KR | 10-2285882 | 8/2021 |

OTHER PUBLICATIONS

Oh et al., "Algorithm based on Byzantine agreement among decentralized agents (BADA)", ETRI Journal, May 6, 2020, pp. 872-885, vol. 42, No. 6.

*Primary Examiner* — Jeffrey C Pwu
*Assistant Examiner* — Samuel Ambaye
(74) *Attorney, Agent, or Firm* — KILE PARK REED & HOUTTEMAN PLLC

(57) ABSTRACT

Disclosed herein are an apparatus and method for distributed consensus in an environment in which a fraction of Byzantine nodes is dynamically changed. The distributed consensus apparatus in a dynamic Byzantine fraction environment includes one or more processor and executable memory for storing at least one program executed by the one or more processors. The at least one program is configured to calculate a stochastic variable for the probability that a preset fraction of Byzantine nodes is changed using the probability that at least one of consensus candidate nodes corresponding to a preset consensus quorum is changed to a Byzantine node and to perform distributed consensus using the stochastic variable in the dynamic Byzantine fraction environment.

10 Claims, 7 Drawing Sheets

APPARATUS AND METHOD FOR DISTRIBUTED CONSENSUS IN DYNAMIC BYZANTINE FRACTION ENVIRONMENT

CROSS REFERENCE TO RELATED APPLICATION

This application claims the benefit of Korean Patent Application No. 10-2021-0179676, filed Dec. 15, 2021, which is hereby incorporated by reference in its entirety into this application.

BACKGROUND OF THE INVENTION

1. Technical Field

The present invention relates generally to distributed consensus technology, and more particularly to distributed consensus technology in an environment in which a fraction of Byzantine nodes is dynamically changed.

2. Description of the Related Art

With the recent advancement of computer technology, various services provided over a network have been developed. However, cyberattacks on servers, cyber frauds, and the like often damage service providers and consumers. Although information protection technology for protecting from such attacks is developed, the number of cyber breaches is increasing.

The reason why attackers are able to easily attack servers is that a few computers providing services are known over a network. A blockchain, which enables distributed computers to simultaneously execute the same program having a specific purpose, may be regarded as a kind of such global virtual computers, but such virtual computers have a problem in that sufficient processing performance is required in order to provide service. Although sufficient computing performance can be obtained using the current computing technology, technology for synchronizing states of distributed computers still remains for solution.

Technology for synchronizing the service-processing states of computers in a blockchain is referred to as distributed consensus technology. Generally, a blockchain performs synchronization for each block. In order to improve performance in consensus for each block, it is necessary to increase the number of transactions contained in a block or to increase the number of transactions processed per unit time by reducing the time taken for consensus. When the number of transactions contained in a block is increased, an increased block size may cause a network propagation delay. Accordingly, a method of increasing the number of blocks created per unit time is attempted in order to improve performance.

In the case of a competitive distributed consensus method based on Proof-of-Work (PoW), it is necessary to lower a difficulty level in order to quickly create a block, but the lowered difficulty level increases the number of forks, and it becomes difficult to guarantee finality. For this reason, interest in a distributed consensus algorithm based on Byzantine Fault Tolerance (BFT), which guarantees finality, is increasing. The BFT-based distributed consensus algorithm reduces the time taken to create a block because finality is guaranteed at the time of creating the block, whereby sufficient transaction-processing performance is achieved.

However, because message complexity in a consensus process is $O(N^2)$, there is a limitation in that consensus may be impossible when the number of nodes increases. Accordingly, a method of selecting some of participating nodes and making the selected nodes participate in consensus is attempted in order to overcome the limitation, but it is difficult for all of the participating nodes to evenly participate in consensus, which may violate decentralization.

In order to guarantee finality in a blockchain and to minimize the consensus cost incurred due to the message complexity of $O(N^2)$ at the current technology level, it is essential to form a representative consensus congress by selecting some nodes from all participating nodes, and a method for maintaining a minimum number of nodes in the consensus congress while ensuring both decentralization and the safety of consensus is required.

Also, when the maximum tolerable fraction of Byzantine faults is assumed to be 30% and is applied through conventional technology, a high level of Byzantine fault tolerance may be guaranteed when a fraction of Byzantine nodes is changed within a range in which the fraction is maintained equal to or less than 30%, but this causes inefficiency by requiring always maintaining a large number of nodes in a consensus congress even in a consensus round in which the actual fraction of Byzantine nodes is less than 30%.

Particularly, when the total number of participating nodes is large, the size of a consensus congress required to be maintained may be excessively increased. That is, a trade-off between the size of a consensus congress and the level of Byzantine fault tolerance is necessarily present, and it is important to set the optimal size of a consensus congress according to the purpose and the environment.

Meanwhile, Korean Patent Application Publication No. 10-2020-0144466, titled "Apparatus and method for distributed consensus based on decentralized Byzantine fault" discloses an apparatus and method for performing distributed consensus by a large number of decentralized nodes by decreasing message exchanges while accommodating a distributed consensus protocol based on Byzantine Fault Tolerance (BFT) by centralized nodes.

However, Korean Patent Application Publication No. 10-2020-0144466 selects a consensus congress on the assumption that a fraction of Byzantine nodes is fixed (e.g., 20%) even though the total number of participating nodes changes. That is, in an actual blockchain operating environment, join/leave events of network participation nodes and attacks by malicious users may freely occur in real time, so the increased fraction of Byzantine nodes may significantly decrease the level of Byzantine fault tolerance of the blockchain.

SUMMARY OF THE INVENTION

An object of the present invention is to minimize the size of a consensus congress selected in a decentralized manner and to guarantee the required Byzantine fault tolerance when a fraction of Byzantine nodes is dynamically changed.

Another object of the present invention is to find a practical agreement for operating a blockchain in the trade-off relationship between the size of a consensus congress and the probability of Byzantine winning.

In order to accomplish the above objects, an apparatus for distributed consensus in a dynamic Byzantine fraction environment according to an embodiment of the present invention includes one or more processors and executable memory for storing at least one program executed by the one or more processors. The at least one program receives delegate request messages including a first transaction for requesting distributed consensus proposed by a client from consensus candidate nodes of a blockchain, selects consensus candidate nodes corresponding to a consensus quorum, among the consensus candidate nodes, as consensus nodes based on the delegate request messages, generates a prepare message including a second transaction for obtaining agreement from the consensus nodes, sends the prepare message to the consensus nodes, receives commit messages including digital signatures of the respective consensus nodes from the consensus nodes as a reply to the prepare message, and completes the distributed consensus by broadcasting a reply message, which is the result of verification of the digital signatures included in the commit messages, to the consensus candidate nodes, the at least one program calculates a stochastic variable for the probability that a preset fraction of Byzantine nodes is changed using the probability that at least one of the consensus candidate nodes corresponding to the preset consensus quorum is changed to a Byzantine node, the consensus quorum is 2f+1 (f being an integer equal to or greater than 1), f satisfies a first condition and a second condition, the first condition is a condition that is satisfied when a first probability, which is the probability that the number of Byzantine nodes to be selected as the consensus candidate nodes is greater than f when the consensus candidate nodes are selected from among all of the nodes of the blockchain using the stochastic variable, is equal to or less than a preset first reference probability, and the second condition is a condition that is satisfied when a second probability, which is the probability that the number of consensus candidate nodes is equal to or less than 3f, is equal to or less than a preset second reference probability.

Here, the fraction of Byzantine nodes may be preset to 0.2 as the default value thereof, and the default value may be changed in a range of real numbers equal to or greater than 0.2 and equal to or less than 0.33 depending on the probability that at least one of the consensus candidate nodes corresponding to the preset consensus quorum is changed to a Byzantine node.

Here, the stochastic variable may be calculated for each range of the changed fraction of Byzantine nodes in consideration of the total number of consensus candidate nodes.

Here, the at least one program may generate a dynamic Byzantine node fraction model for modeling the fraction of Byzantine nodes based on the stochastic variable.

Here, the first reference probability may be set in consideration of the probability that at least one of the consensus candidate nodes corresponding to the consensus quorum is changed to a Byzantine node.

Also, in order to accomplish the above objects, a method for distributed consensus in a dynamic Byzantine fraction environment, performed by a distributed consensus apparatus in the dynamic Byzantine fraction environment, according to an embodiment of the present invention includes receiving delegate request messages including a first transaction for requesting distributed consensus proposed by a client from consensus candidate nodes of a blockchain and selecting consensus candidate nodes corresponding to a consensus quorum, among the consensus candidate nodes, as consensus nodes based on the delegate request messages; generating a prepare message including a second transaction for obtaining agreement from the consensus nodes and sending the prepare message to the consensus nodes; and receiving commit messages including digital signatures of the respective consensus nodes from the consensus nodes as a reply to the prepare message and completing the distributed consensus by broadcasting a reply message, which is the result of verification of the digital signatures included in the commit messages, to the consensus candidate nodes.

Selecting the consensus candidate nodes corresponding to the consensus quorum comprises calculating a stochastic variable for the probability that a preset fraction of Byzantine nodes is changed using the probability that at least one of the consensus candidate nodes corresponding to the preset consensus quorum is changed to a Byzantine node, the consensus quorum is 2f+1 (f being an integer equal to or greater than 1), f satisfies a first condition and a second condition, the first condition is a condition that is satisfied when a first probability, which is the probability that the number of Byzantine nodes to be selected as the consensus candidate nodes is greater than f when the consensus candidate nodes are selected from among all of the nodes of the blockchain using the stochastic variable, is equal to or less than a preset first reference probability, and the second condition is a condition that is satisfied when a second probability, which is the probability that the number of consensus candidate nodes is equal to or less than 3f, is equal to or less than a preset second reference probability.

Here, the fraction of Byzantine nodes may be preset to 0.2 as the default value thereof, and the default value may be changed in a range of real numbers equal to or greater than 0.2 and equal to or less than 0.33 depending on the probability that at least one of the consensus candidate nodes corresponding to the preset consensus quorum is changed to a Byzantine node.

Here, the stochastic variable may be calculated for each range of the changed fraction of Byzantine nodes in consideration of the total number of consensus candidate nodes.

Here, selecting the consensus candidate nodes corresponding to the consensus quorum may comprise generating a dynamic Byzantine node fraction model for modeling the fraction of Byzantine nodes based on the stochastic variable.

Here, the first reference probability may be set in consideration of the probability that at least one of the consensus candidate nodes corresponding to the consensus quorum is changed to a Byzantine node.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
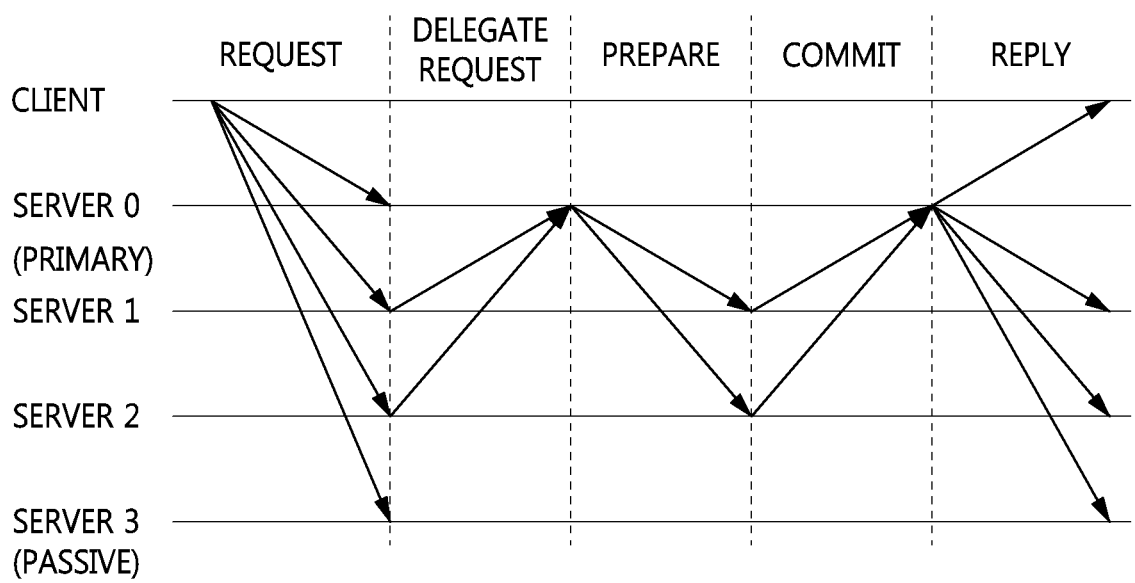
FIG. 1 is a view illustrating a distributed consensus protocol according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 2:
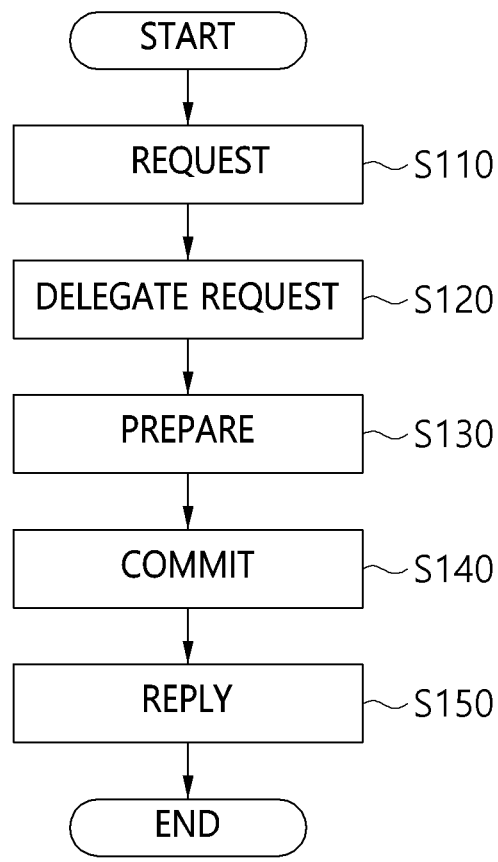
FIG. 2 is a flowchart illustrating a distributed consensus method in a dynamic Byzantine fraction environment according to an embodiment of the present invention.

FIG. 1 is a view illustrating a distributed consensus protocol in a dynamic Byzantine fraction environment according to an embodiment of the present invention. FIG. 2 is a flowchart illustrating a distributed consensus method in a dynamic Byzantine fraction environment according to an embodiment of the present invention.

Referring to FIG. 1, a distributed consensus protocol in a dynamic Byzantine fraction environment according to an embodiment of the present invention may be a distributed consensus protocol based on Byzantine Fault Tolerance (BFT).

In the BFT-based distributed consensus protocol, a block is agreed on through a request phase, a delegate request phase, a prepare phase, a commit phase, and a replay phase.

On the left side of FIG. 1, the roles of respective nodes are illustrated. In FIG. 1, servers 0 to 3 are congress members for a block for which consensus is being performed. Server 0 consists of one server, but each of servers 1 to 3 consists of n servers. Here, n>=1 is satisfied. The congress members may be changed for each block.

Referring to FIG. 2, in the distributed consensus method in a dynamic Byzantine fraction environment according to an embodiment of the present invention, distributed consensus may be performed according to the distributed consensus protocol based on Byzantine Fault Tolerance (BFT) illustrated in FIG. 1.

First, a request phase in which a client sends a request for distributed consensus to consensus candidate nodes may be performed at step S110.

The client is the entity that generates a request, and the request may correspond to the transaction to be processed. The transaction message to be processed may include a means for checking integrity, such as a digital signature, or the like.

Also, nodes in a blockchain network according to an embodiment of the present invention may include multiple servers.

For example, the multiple servers may include servers 0 to 3. Servers 0 to 3 are congress members for the block for which consensus is being performed. Here, server 0 may consist of one server, but each of servers 1 to 3 may consist of n servers, n being equal to or greater than 1 (n>=1). The congress members may be changed for each block.

Here, server 0 may be a primary node (a server on a transmission side) corresponding to a distributed consensus apparatus in a dynamic Byzantine fraction environment according to an embodiment of the present invention.

Here, servers 1 to 3 may be sub-nodes (servers on a reception side) that receive a request from the client and send a delegate request to server 0 according to an embodiment of the present invention.

That is, at step S110, the client may broadcast a request message including a first transaction to consensus candidate nodes of the blockchain in order to request distributed consensus.

Also, in the distributed consensus method in a dynamic Byzantine fraction environment according to an embodiment of the present invention, a delegate request phase in which delegate request messages are received may be performed at step S120.

That is, at step S120, delegate request messages including the first transaction for requesting processing of the transactions, which is requested by the client, are received from the consensus candidate nodes of the blockchain, and based on the delegate request messages, consensus candidate nodes corresponding to a consensus quorum, among the consensus candidate nodes, may be selected as consensus nodes.

Here, according to an embodiment of the present invention, the nodes that gain the chance to directly participate in consensus for the block of a specific height may be referred to as a consensus congress, and the minimum number of nodes required for voting in the consensus congress may be referred to as a consensus quorum.

The number of nodes corresponding to the consensus congress is $3f+1$, the consensus quorum is $2f+1$ (f being an integer equal to or greater than 1), and f satisfies both a first condition and a second condition. Here, the first condition may be a condition that is satisfied when a first probability, which is the probability that the number of Byzantine nodes to be selected as the consensus candidate nodes is greater than f when the consensus candidate nodes, among all of the nodes in the blockchain, are selected with the probability of p (p being a real number equal to or greater than 0 and equal to or less than 1), is equal to or less than a preset first reference probability, and the second condition may be a condition that is satisfied when a second probability, which is the probability that the number of consensus candidate nodes is equal to or less than 3f when the same consensus candidate nodes are selected with the probability of p (p being a real number equal to or greater than 0 and equal to or less than 1), is equal to or less than a preset second reference probability.

For example, n is the number of all of the nodes, $b_p$ is a fraction of Byzantine nodes, among all of the nodes, and b is the number of Byzantine nodes. Also, if a node performs a coin toss and is selected when a coin comes up heads, p is the probability that the coin will come up heads.

Here, when n is 1000 and when $b_p$ is 0.2 (20% of all of the nodes are Byzantine nodes), b is calculated to be 200 ($b = n*b_p = 1000*0.2 = 200$).

For example, it is assumed that each of all participating nodes (n nodes) performs a coin toss once with a biased coin in which the probability of getting heads, p, is 0.1 and that a node is selected as a consensus candidate node when the coin comes up heads.

Here, the number of nodes for which the coin comes up heads follows a binomial distribution, so the average is calculated to be 100 by calculating n*p.

Here, because the number of nodes is sufficiently large (being equal to or greater than 30), the probability that a node is selected may approach a normal distribution by the "central limit theorem", but exactly, it may follow a binomial distribution.

Here, if the coin tosses performed by the respective nodes are independent of each other (that is, the outcome of a coin toss performed by each node is not affected by the outcome of the coin toss performed by the previous node), when some of all of the nodes are isolated as a group, the distribution of the probability that the isolated nodes are selected may be separately calculated.

Therefore, if 20% of all of the nodes (n nodes) are Byzantine nodes, when only the b Byzantine nodes perform a coin toss with a coin having the probability of getting heads, p, the cumulative probability that the number of selected nodes for which the coin comes up heads, k, is equal to or less than f may be calculated using Equation (1) below (a cumulative probability of a binomial distribution).

$$\sum_{k=0}^{f} \binom{b}{k} p^k (1-p)^{(b-k)} \qquad (1)$$

Here, Equation (2) may satisfy the condition in which, when the Byzantine nodes perform a coin toss with a coin having the probability of getting heads, p, the probability that k, which is the number of nodes for which the coin comes up heads, is greater than f is equal to or less than $P_{max\_bzt}$.

$$1 - \sum_{k=0}^{f} \binom{b}{k} p^k (1-p)^{(b-k)} \leq P_{max\_bzt} \qquad (2)$$

Here, $1.1e^{-16}=P_{max\_bzt}$ may be satisfied. This value is not fixed, and other values (e.g., $5e^{-9}$) may be used depending on system design.

Also, the condition in which, when all of the nodes (n nodes) perform a coin toss with a coin having the same probability p, the cumulative probability that the number of nodes for which the coin comes up heads, x, is equal to or less than 3f is equal to or less than $P_{min\_node}$ may be represented as shown in Equation (3) below:

$$\sum_{x=0}^{3f} \binom{n}{x} p^x (1-p)^{(n-x)} \leq P_{min\_node} \qquad (3)$$

When the number of all participating nodes, n, is given, p satisfying both Equation (2) and Equation (3) may be calculated while increasing the probability that a node is selected. When nodes perform a coin toss with the calculated probability p and when 3f+1 nodes are randomly selected as a consensus congress from among the nodes for which the coin comes up heads, the probability that the number of Byzantine nodes included in the consensus congress is greater than f may be maintained equal to or less than $P_{max\_bzt}$.

For example, the total number of nodes n=1000, a Byzantine fraction $b_p$=0.2, the number of Byzantine nodes b=n*$b_p$=1000*0.2=200, $P_{max\_bzt}=1.1e^{-16}$, and $P_{min\_node}=1.0e^{-6}$ may be satisfied. Here, p, which is the probability that a node is selected, increases from 0, and p satisfying both Equation (2) and Equation (3) is calculated. If p=0.1 satisfies Equations (2) and (3), when each node checks whether the node is selected by performing a coin toss and when the coin tosses performed by the respective nodes are independent, the average number of nodes selected from among the 200 Byzantine nodes may be 20 (the average=b*p=200*0.1=20 because the probability p that a node is selected is 0.1).

Because the probability that the number of nodes for which a coin comes up heads, among the 200 Byzantine nodes, is greater than 30 is very low in Equation (2), it may be assumed that the probability is equal to or less than $P_{max\_bzt}$.

Here, when a total of 1000 nodes perform a coin toss, the average number of nodes for which the coin comes up heads may be 100.

Here, if the probability that the coin comes up heads in 90 or fewer nodes can be calculated to be less than $P_{min\_node}$, when all of the nodes perform a coin toss and when 91 nodes are randomly selected as a consensus congress from among the nodes for which the coin comes up heads, the probability that the number of Byzantine nodes included in the 91 nodes is greater than 30 may be still equal to or less than $P_{max\_bzt}$.

Because, the probability that 30 or more Byzantine nodes are selected is equal to or less than $P_{max\_bzt}$ when 200 Byzantine nodes perform a coin toss with the probability of 0.1.

That is, all of the nodes corresponding to a consensus quorum to participate in consensus in the blockchain according to an embodiment of the present invention may calculate whether a fraction of Byzantine nodes included in an arbitrary number of nodes selected by a coin toss is greater than 33% for all cases and add up the calculation results.

Here, at step S120, all of the nodes may calculate a number satisfying the condition in which the maximum number of Byzantine nodes to be selected does not exceed a preset probability and set the calculated number as the number of nodes f, and may then select a consensus congress while maintaining the number of Byzantine nodes at a desired level under the conditions in which 2f+1 nodes are randomly selected as a consensus quorum and in which the number of Byzantine nodes does not exceed f in the environment in which 3f+1 or more nodes can be selected from among all of the nodes.

However, when the fraction of the Byzantine nodes included in all participating nodes increases even by 1% and thereby becomes 21%, performance may rapidly decrease depending on the total number of nodes.

Accordingly, a fraction of Byzantine nodes, which is given as a single value such as 0.2 (20%), may be modeled as a stochastic variable X in the present invention.

Here, the value that can be set as the stochastic variable X is 0.2, 0.21, 0.22, 0.33, or the like, and may be a fraction of Byzantine nodes equal to or greater than 0.2 and equal to or less than 0.33.

Because a fraction of Byzantine nodes may change depending on the number of all nodes, the stochastic variable may correspond to a binomial stochastic variable.

That is, a probability function defined as $P(X=x_0)=y_0$, $P(X=x_1)=y_1$, $P(X=x_2)=y_2$, ... is present for the stochastic variable X, and it may represent that the probability of a fraction of Byzantine nodes being $x_0$ is $y_0$ over the entire operation period of a blockchain (in all of the consensus rounds).

First, when the frequency of a specific fraction of Byzantine nodes in all of the consensus rounds can be specified as a number, a basic model such as an example shown in Table 1 may be established.

TABLE 1

| x | 0.2 | 0.21 | 0.22 |
|---|---|---|---|
| P(x) | 1 − (1e−3) − (1e−5) | 1e−3 | 1e−5 |

It can be seen that Table 1 illustrates an example of a basic example model for modeling an environment in which a specific fraction of Byzantine nodes occurs with a specific probability. The ranges of x and the value of P(x) may be arbitrarily set by a user. In this basic example model, the event in which a fraction of Byzantine nodes is 21% in all of the consensus rounds without effects of other variables, such as the number of participating nodes, and the like, occurs with the probability of $1e^{-3}$ (once out of a thousand times), the event in which a fraction of Byzantine nodes is 22% occurs with the probability of $1e^{-5}$, and a fraction of Byzantine nodes maintains at 20% in all of the remaining cases. That is, the fraction of Byzantine nodes maintains at 20% in most consensus rounds, but a fraction of Byzantine nodes higher than 20%, that is, 21% or 22%, may occur with a very low probability. When the basic example model according to the present embodiment is used, a user may select a possible fraction of Byzantine nodes and directly specify the frequency of occurrence thereof.

As an advanced form of the basic example model, the present invention proposes a dynamic Byzantine node fraction model in consideration of an environment in which the frequency of occurrence of each fraction of Byzantine nodes is changed depending on the total number of participating nodes. In the basic example model, the frequency of occurrence of a fraction of Byzantine nodes is set as an independent value that is not affected by other variables. However, in an actual blockchain environment, when the total number of participating nodes is 10, addition of only one Byzantine node increases the fraction of Byzantine nodes by 10%, so the probability that a high fraction of Byzantine nodes occurs may be high when n is small, compared to when n is large. Accordingly, in the dynamic Byzantine node fraction model, when the fraction of already existing Byzantine nodes is r (e.g., 20%), among all of the participating nodes n, the number of Byzantine nodes may be b=$\lfloor rn \rfloor$. Here, when the probability that one honest node can be changed to a Byzantine node by being attacked is defined as $p_{comp}$, the probability that m honest nodes are changed to Byzantine nodes and added to the already existing b Byzantine nodes may be calculated as shown in Equation (4) below:

$$\binom{n-b}{m} p_{comp}^m (1 - p_{comp})^{n-b-m} \quad (4)$$

Also, when m honest nodes are additionally changed to Byzantine nodes, the fraction of Byzantine nodes, among all participating nodes, may be changed from the initial value r to $$\frac{b+m}{n}.$$

Meanwhile, based on the basic assumption that the maximum faction of Byzantine nodes, among all participating nodes in a blockchain, cannot exceed 33% (the maximum faction of Byzantine nodes that can be tolerated in a consensus algorithm that guarantees finality), the range of m is limited to the range from 0 to $$\left(\left\lfloor \frac{n-1}{3} \right\rfloor - b\right),$$

and the probability of occurrence of a Byzantine fraction for the case in which m is greater than $$\left\lfloor \frac{n-1}{3} \right\rfloor - b$$

may be accumulated to $$\left\lfloor \frac{n-1}{3} \right\rfloor - b,$$

which is the maximum value of m.

Here, a Byzantine fraction and a stochastic variable $X_n$ for representing the probability that the corresponding Byzantine fraction occurs may be set for each value of n. Unlike the basic example model in which a uniform stochastic variable X is applied to all values of n, the dynamic Byzantine node fraction model may be configured such that a different stochastic variable $X_n$ may be set for each value of n.

For example, when a stochastic variable $X_{10}$ is calculated for modeling a fraction of Byzantine nodes in the environment in which the number of all participating nodes is 10, a basic fraction of Byzantine nodes is 0.2, and the probability that one honest node is changed to a Byzantine node is 0.01 (n=10, r=0.2, and $p_{comp}$=0.01), it may be represented as shown in Table 2 below (the value being rounded to the third decimal place).

TABLE 2

| m | 0 | 1 |
|---|---|---|
| x | 0.2 | 0.3 |
| P(x) | 0.923 | 0.077 |

Likewise, when a stochastic variable $X_{100}$ is calculated for modeling a fraction of Byzantine nodes in the environment in which the number of all participating nodes is 100, a basic fraction of Byzantine nodes is 0.2, and the probability that one honest node is changed to a Byzantine node is 0.01 (n=100, r=0.2, and $p_{comp}$=0.01), it may be represented as shown in Table 3 below (the value being rounded to the third decimal place).

TABLE 3

| m | 0 | 1 | 2 | ... | 10 | ... | 13 |
|---|---|---|---|---|---|---|---|
| x | 0.2 | 0.21 | 0.22 | ... | 0.3 | ... | 0.33 |
| P(x) | 0.448 | 0.362 | 0.144 | ... | 8.147e−9 | ... | 1.690e−12 |

As the last example, when a stochastic variable $X_{5000}$ is calculated for modeling a fraction of Byzantine nodes in the environment in which the number of all participating nodes is 5000, a basic fraction of Byzantine nodes is 0.2, and the probability that one honest node is changed to a Byzantine node is 0.01 (n=5000, r=0.2, and $p_{comp}$=0.01), it may be represented as shown in Table 4 below (the value being rounded to the third decimal place).

TABLE 4

| m | 0 | 1 | 2 | ... | 500 | ... | 666 |
|---|---|---|---|---|---|---|---|
| x | 0.2 | 0.2002 | 0.2004 | ... | 0.3 | ... | 0.3332 |
| P(x) | 3.474e−18 | 1.403e−16 | 2.835e−15 | ... | ≈0 | ... | ≈0 |

As shown in Tables 2 to 4, as the value of n increases, the probability of a high Byzantine fraction becomes lower, and when n is increased to 5000 as in Table 4, the probability converges to 0.

Here, at step S120, the required size of a representative consensus congress may be set using the dynamic Byzantine node fraction model. The number of Byzantine nodes, b, out of the total number of all nodes, n, may be represented as =x, and Equations (2) to (4) may be used in order to control the probability that the number of finally selected Byzantine nodes is greater than f (the probability of Byzantine winning) so as to be less than a certain level when each node is selected as a consensus congress with the probability of p.

Here, at step S120, the probability of occurrence of each fraction of Byzantine nodes is reflected, whereby $P_{max\_bz\_dynamic_t}$ satisfying $P(X=x) \times P_{max\_bzt\_dynamic} = P_{max\_bzt}$ may be variably applied depending on each value.

Here, at step S120, the guaranteed probability of Byzantine winning may be represented by multiplying the probability that a given Byzantine fraction occurs by the probability that a consensus congress fails to be formed when the corresponding fraction occurs.

Accordingly, when the Byzantine fraction is 0.2, which accounts for a high proportion in the examples of Tables 1 to 4, the probability that the number of Byzantine nodes is greater than f may be controlled with the probability f of $1e^{-15}$, and when the Byzantine fraction is 0.21 or 0.22, which infrequently occurs, the consensus safety conforming with $P_{max\_bzt}$ may still be guaranteed when the frequency of occurrence thereof is considered.

For example, when a Byzantine fraction is 0.22 and when the probability of the occurrence thereof is $1e^{-5}$, if the probability of Byzantine winning is controlled based on the probability of $1e^{-10}$, the event in which consensus actually fails may occur with the probability of $1e^{-15}$ (equal to $P_{max\_bzt}$).

This may be represented as shown in Equation (5) below:

$$1 - \sum_{k=0}^{f} \binom{b}{k} p^k (1-p)^{(b-k)} \leq P_{max\_bzt\_dynamic} \quad (5)$$

When the values of b and $P_{max\_bzt\_dynamic}$ are substituted into Equation (5) as defined above, this may be represented as shown in Equation (6) below:

$$1 - \sum_{k=0}^{f} \binom{xn}{k} p^k (1-p)^{(xn-k)} \leq \frac{P_{max\_bzt}}{P(x)} \quad \text{for all } x \in X \quad (6)$$

When f satisfying the conditions is determined, Equation (3) above may be used without change as the condition equation for the total number of nodes that has to be selected.

Accordingly, at step S120, a stochastic variable for the probability that a preset fraction of Byzantine nodes is changed may be calculated using the probability that at least one of the consensus candidate nodes corresponding to the preset consensus quorum is changed to a Byzantine node.

Here, the consensus quorum is 2f+1 (f being an integer equal to or greater than 1), f satisfies a first condition and a second condition, the first condition is a condition that is satisfied when a first probability, which is the probability that the number of Byzantine nodes to be selected as the consensus candidate nodes is greater than f when the consensus candidate nodes are selected from among all of the nodes in the blockchain using the stochastic variable, is equal to or less than a preset first reference probability, and the second condition is a condition that is satisfied when a second probability, which is the probability that the number of consensus candidate nodes is equal to or less than 3f, is equal to or less than a preset second reference probability.

Here, the fraction of Byzantine nodes is preset to 0.2 as the default value thereof, and the default value may change in the range of real numbers equal to or greater than 0.2 and equal to or less than 0.33 depending on the probability that at least one of the consensus candidate nodes corresponding to the preset consensus quorum is changed to a Byzantine node.

Here, the stochastic variable may be calculated for each range of the changing fraction of the Byzantine nodes in consideration of the total number of consensus candidate nodes.

Here, the first reference probability may be set in consideration of the probability that at least one of the consensus candidate nodes corresponding to the consensus quorum is changed to a Byzantine node.

Here, at step S120, a dynamic Byzantine node fraction model for modeling the fraction of Byzantine nodes based on the stochastic variable, may be generated.

That is, at step S120, when the value satisfying both Equation (5) and Equation (6) is calculated for each value of n, the consensus congress selection probability guaranteeing the required Byzantine fault tolerance while minimizing the size of a consensus congress may be determined in the environment in which the fraction of Byzantine nodes is given as a dynamic range.

Also, at step S120, the delegate request messages, including information indicating whether each of all nodes is selected as a consensus candidate node, are received from all of the nodes. Here, when the number of nodes sending the delegate request message is equal to or greater than 3f+1, 3f+1 nodes are selected as the consensus candidate nodes for the next distributed consensus, and when the number of nodes sending the delegate request message is equal to or less than 3f, the consensus candidate nodes may not be updated.

Here, at step S120, when the delegate request messages, the number of which corresponds to the consensus quorum, are received, the second transaction may be determined based on the f+1 same first transactions included in the delegate request messages, the number of which corresponds to the consensus quorum.

Here, at step S120, a nonce chain value may be checked for the validity of the delegate request messages of the consensus candidate nodes sending the delegate request messages.

Here, when consecutive hash values in the hash chain are used as the nonce chain value in the integrity checking process at step S120, whether a man-in-the-middle attack occurs may be checked without a digital signature, and cost for validity checking may be minimized in the apparatus receiving the delegate request messages.

Here, in the integrity checking process at step S120, the validity of pki and Qi of the consensus nodes may be simultaneously checked. Accordingly, it is possible to defend against bogus pki or bogus Qi generated by a man-in-the-middle attacker.

Here, at step S120, when a node has not passed the integrity checking process, the corresponding node is excluded from the consensus congress for the next block, and the situation may be recorded in a log.

Here, at step S120, when the corresponding node is excluded, if the size of the consensus congress is still greater than the consensus quorum, consensus may be performed normally, but if the size of the consensus congress becomes less than the consensus quorum, the current consensus congress may constitute a consensus congress for the next block or an empty agreement may be performed.

Also, at step S120, when a man-in-the-middle attacker (an intermediate delivery node) tampers with the delegate request message and sends the same, whether the delegate request message is tampered with may be checked using a message digest.

Because a man-in-the-middle attacker intercepts a delegate request message of a node and uses normal Nonce (2N), it may pass a nonce validity check and a coupon validity check.

Here, the man-in-the-middle attacker sends a message in which original data is damaged using pki or Qi generated thereby. However, because the man-in-the-middle attacker is not able to predict Nonce(2N+1), it is impossible to pass a message digest check.

Here, at step S120, when a node has not passed the message digest check, the corresponding node is determined to be a man-in-the-middle attacker and excluded from the consensus congress, and the situation may be recorded in a log.

Here, at step S120, when the corresponding node is excluded, if the size of the consensus congress is still greater than the consensus quorum, consensus may be performed normally, but if the size of the consensus congress becomes less than the consensus quorum, the current consensus congress may constitute a consensus congress for the next block or an empty agreement may be performed.

Also, in the distributed consensus method in a dynamic Byzantine fraction environment according to an embodiment, a prepare phase in which a prepare message is sent to the consensus nodes in order to obtain agreement on the result of selecting the consensus nodes may be performed at step S130.

That is, at step S130, a prepare message including a second transaction for obtaining agreement on the result of selecting the consensus nodes may be generated and sent to the consensus nodes.

Here, at step S130, first bitmap information corresponding to the first transaction of the consensus candidate nodes and second bitmap information including the result of selecting the consensus nodes are generated, and a prepare message including the first bitmap information, the second bitmap information, and the second transaction may be generated.

Here, at step S130, the consensus nodes may verify the validity of the prepare message by checking whether the first bitmap information corresponds to the second bitmap information.

Here, at step S130 a first combined public key and a first combined quorum value may be generated by respectively combining the public keys and the quorum values included in the delegate request messages, and the prepare message further including a first hash value, acquired by hashing the first combined public key and the first combined quorum value, may be generated.

Here, at step S130, the consensus nodes may generate a second combined public key and a second combined quorum value by respectively combining previously registered public keys and previously registered quorum values and verify the validity of the prepare message by checking whether the first hash value is equal to a second hash value acquired by hashing the second combined public key and the second combined quorum value.

Also, in the distributed consensus method in a dynamic Byzantine fraction environment according to an embodiment of the present invention, a commit phase in which commit messages including the digital signatures of the respective consensus nodes are received from the consensus nodes as a reply to the prepare message may be performed at step S140.

That is, at step S140, the commit messages in which the digital signatures of the respective consensus nodes are included may be received from the consensus nodes as a reply to the prepare message.

Here, at step S140, when the second hash value is equal to the first hash value, the consensus nodes may generate signature values including the first hash value and private values stored in advance in the consensus nodes, include the signature values in the commit messages, and add the digital signatures based on the signature values, thereby generating the commit messages.

Here, at step S140, the signature values included in the commit messages, the public keys of the first combined public key, and the quorum values of the first combined quorum value are respectively combined as the signature value of a multi-signature, the public key of the multi-signature, and the quorum value of the multi-signature in the form of trees, whereby the multi-signature may be generated from the digital signatures.

Here, at step S140, a multi-signature is generated by combining the digital signatures, and the multi-signature is verified, whereby a false digital signature may be excluded from the digital signatures.

Here, at step S140, in the multi-signature, the tree of the signature values, the tree of the first combined public key, and the tree of the first combined quorum value may be verified in the order from the top level thereof to the bottom level thereof.

Here, at step S140, when all of the results of checking the values included in levels from the current level to the lower level thereof in any one of the trees included in the multi-signature are abnormal, at least one digital signature included in the levels below the lower level may be determined to be a false digital signature.

Also, in the distributed consensus method in a dynamic Byzantine fraction environment according to an embodiment of the present invention, a reply phase in which distributed consensus is performed by broadcasting the verification result to the candidate nodes may be performed at step S150.

That is, at step S150, the result of verification of the digital signatures is broadcast to the consensus candidate nodes, whereby distributed consensus may be completed.

Here, at step S150, when the result of verification of the multi-signature is 'true', a reply message including the second transaction and the multi-signature may be generated.

Here, when a block is transferred as a reply, if information about the selected consensus congress for the block is included and transferred to the nodes, step S150 is the phase for consensus on the next block, and a consensus congress and a consensus quorum may be used by selecting any one of schemes 1 to 3.

Figure 3:
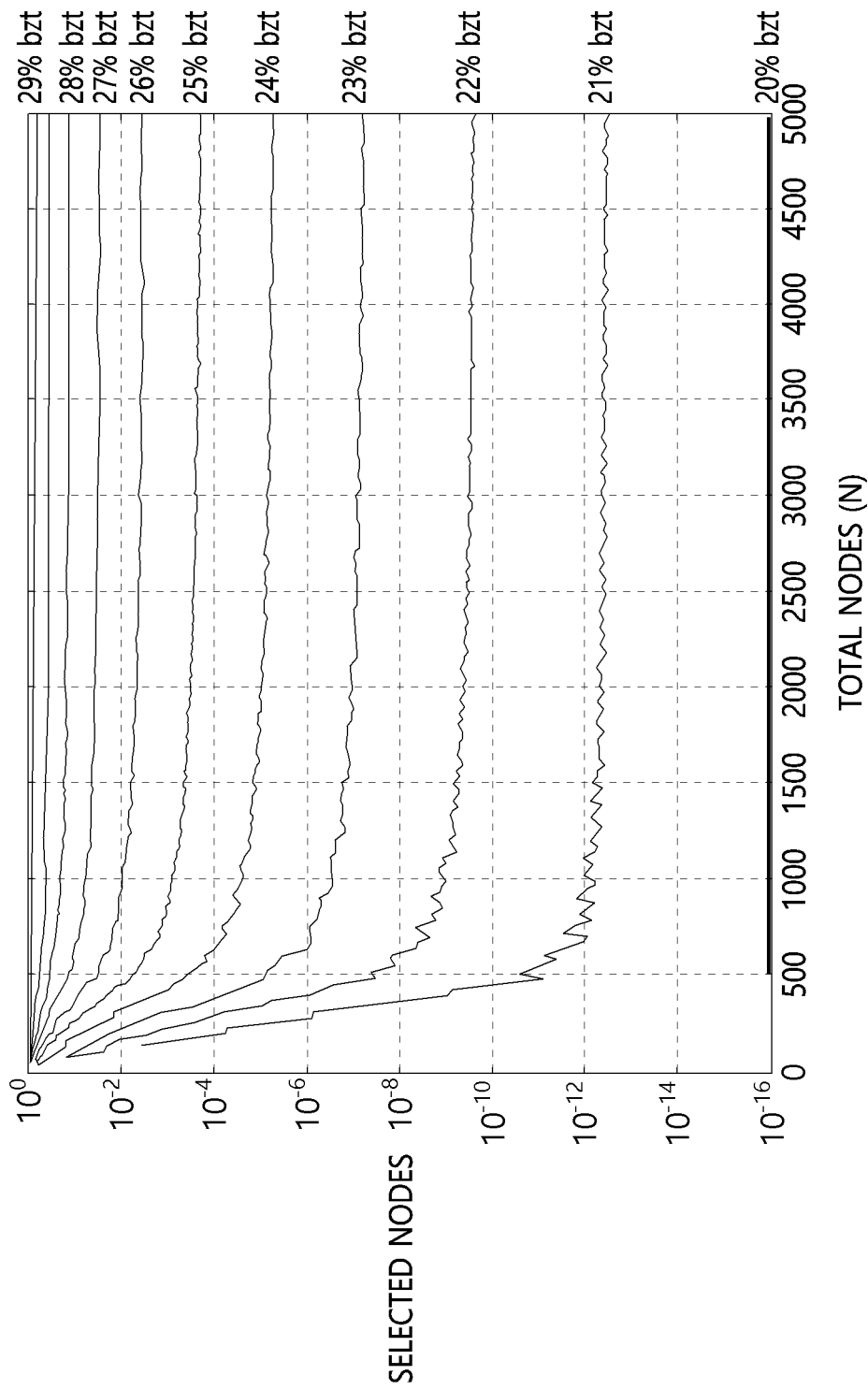
FIG. 3 is a graph illustrating the probability that a Byzantine fault occurs depending on a fraction of Byzantine nodes in a dynamic Byzantine fraction environment according to an embodiment of the present invention.

FIG. 3 is a graph illustrating the probability that a Byzantine fault occurs depending on a fraction of Byzantine nodes in a dynamic Byzantine fraction environment according to an embodiment of the present invention.

Referring to FIG. 3, it can be seen that the probability that a Byzantine fault occurs is illustrated when a fraction of Byzantine nodes changes from 21% to 29% although a consensus congress is formed on the assumption that a fraction of Byzantine nodes is 20%.

When a fraction of Byzantine nodes is 20%, the probability that the fraction of Byzantine nodes included in a consensus congress is greater than 33% (referred to as an error hereinbelow) is maintained equal to or less than $1e^{-15}$ for all of the different total numbers of participating nodes.

However, when the fraction of Byzantine nodes included in all of the participating nodes becomes 21%, 22%, or the like by exceeding 20%, the probability that the fraction of Byzantine nodes included in a consensus congress is greater than 33% increases, and it increases more rapidly as the total number of nodes is smaller.

As shown in FIG. 3, when the fraction of Byzantine nodes included in all participating nodes is 21% and when the total number of all participating nodes is 1000, the probability that an error occurs is still about $1e^{-12}$, and it is difficult to say that a serious problem occurs. However, when the number of participating nodes is 100, the probability of occurrence of an error is about $1e^{-3}$, which means that a consensus congress that cannot tolerate a Byzantine fault may be formed once out of a thousand times.

The reason for the above problem is that the required number of nodes in a consensus congress is determined in an environment in which a fraction of Byzantine nodes that can be present among all participating nodes is fixed to a static value 20%.

In this case, the level of Byzantine fault tolerance cannot be guaranteed or predicted for the range in which a fraction of Byzantine nodes is greater than the initially fixed value, and particularly in the section in which there is only a small number of participating nodes, as in the above example, even a very small increase in a fraction of Byzantine nodes may significantly decrease the level of Byzantine fault tolerance of a blockchain.

In an actual blockchain operating environment, join/leave events of network participation nodes and attacks by malicious users may freely occur in real time, unlike the environment in which a fraction of Byzantine nodes is fixed to 20%. Therefore, it may be more practical to assume a fraction of Byzantine nodes that can be present in a specific consensus round to be a dynamic value (changed to be equal to or greater than 20%), rather than a fixed value (20% or the like), as in the present invention. For example, even in an environment in which a fraction of Byzantine nodes is 20% on average, the fraction of Byzantine nodes may become temporarily greater than 20%, e.g., 22%, due to various reasons.

Particularly, a range within which a fraction of Byzantine nodes changes may be widened in an environment in which the total number of participating nodes is small, and this may adversely affect the security of a blockchain. For example, assume an environment in which the total number of participating nodes is 10. If the initially assumed fraction of Byzantine nodes is 20%, the number of Byzantine nodes may be 2.

Here, when only one node is additionally changed to a Byzantine node due to hacking or the like by a malicious user, the fraction of Byzantine nodes rapidly increases to 30%. If one additional node is changed to a Byzantine node, the fraction of Byzantine nodes is 40%, and consensus for guaranteeing finality may be impossible regardless of whether a consensus congress is formed. Accordingly, when a small number of participating nodes is present, a distributed consensus method to which a dynamic Byzantine node fraction model proposed in the present invention, which is capable of tolerating a higher Byzantine fraction, is applied, is required, as described above.

Figure 4:
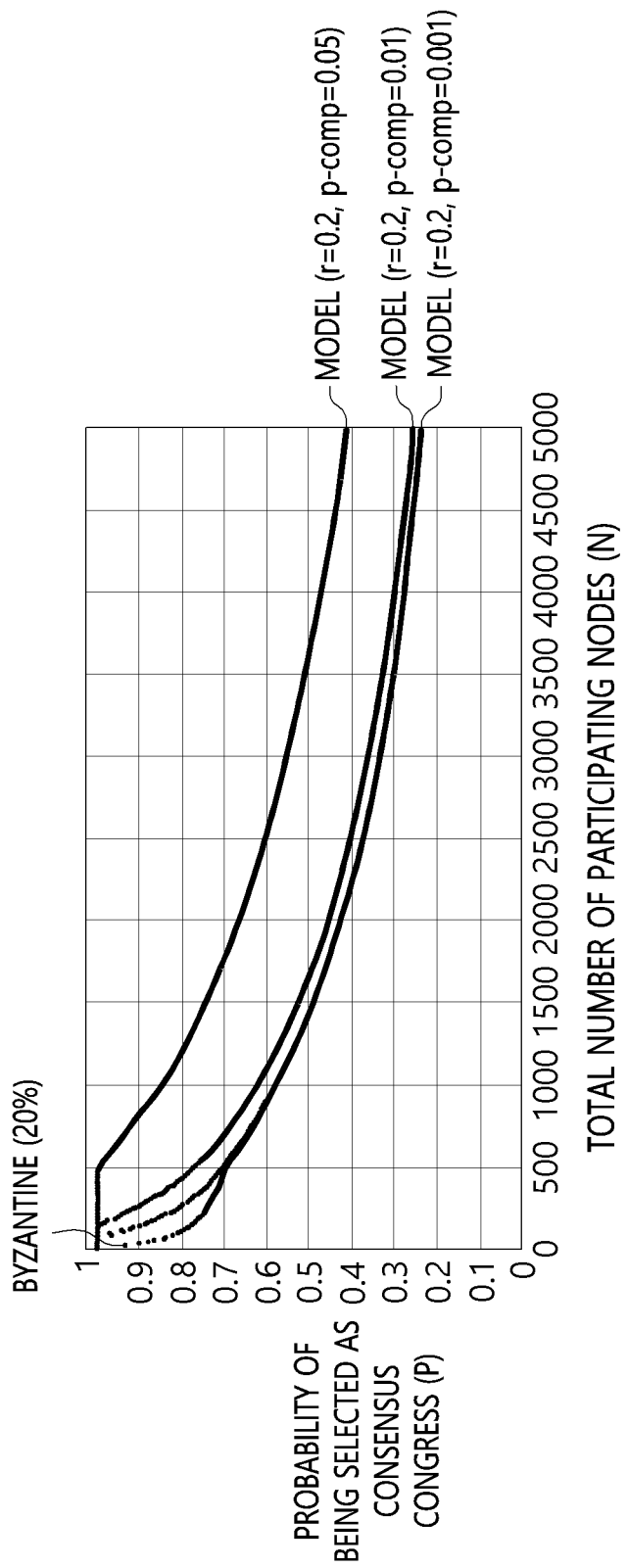
FIG. 4 is a graph illustrating a result of setting the probability of being selected as a consensus congress in consideration of a fixed fraction of Byzantine nodes and a dynamic fraction of Byzantine nodes according to an embodiment of the present invention.

FIG. 4 is a graph illustrating the result of determining the probability of being selected as a consensus congress in consideration of a fixed fraction of Byzantine nodes and a dynamic fraction of Byzantine nodes according to an embodiment of the present invention.

Referring to FIG. 4, it can be seen that the probability of being selected as a consensus congress is determined in the environment in which a fraction of Byzantine nodes may increase by an attacker when the current fraction of Byzantine nodes, among all participating nodes, is 20%.

That is, it can be seen that, in the dynamic Byzantine fraction model, a result is calculated by changing the probability $p_{comp}$ that one honest node is attacked and changed to a Byzantine node when a basic Byzantine fraction is fixed to $r=0.2$.

That is, it can be seen that the probability p of being selected as a consensus congress is calculated depending on the value of $p_{comp}$, which is a parameter of the dynamic Byzantine fraction model.

When the result of using a fraction of Byzantine nodes fixed to 20% is compared with the result of using the dynamic Byzantine fraction model in which $p_{comp}$ is set to 0.001 ($p_{comp}=0.001$), the consensus congress is selected with nearly the same probability in the section in which there is a large number of nodes, but in the section in which the number of nodes is less than about 500, the use of the dynamic Byzantine fraction model increases the probability that nodes are selected as a consensus congress, thereby additionally ensuring the safety.

When $p_{comp}$ is increased to 0.05 ($p_{comp}=0.05$), a consensus congress is conservatively formed by maintaining p at 1 for up to a total number of 480 participating nodes.

Figure 5:
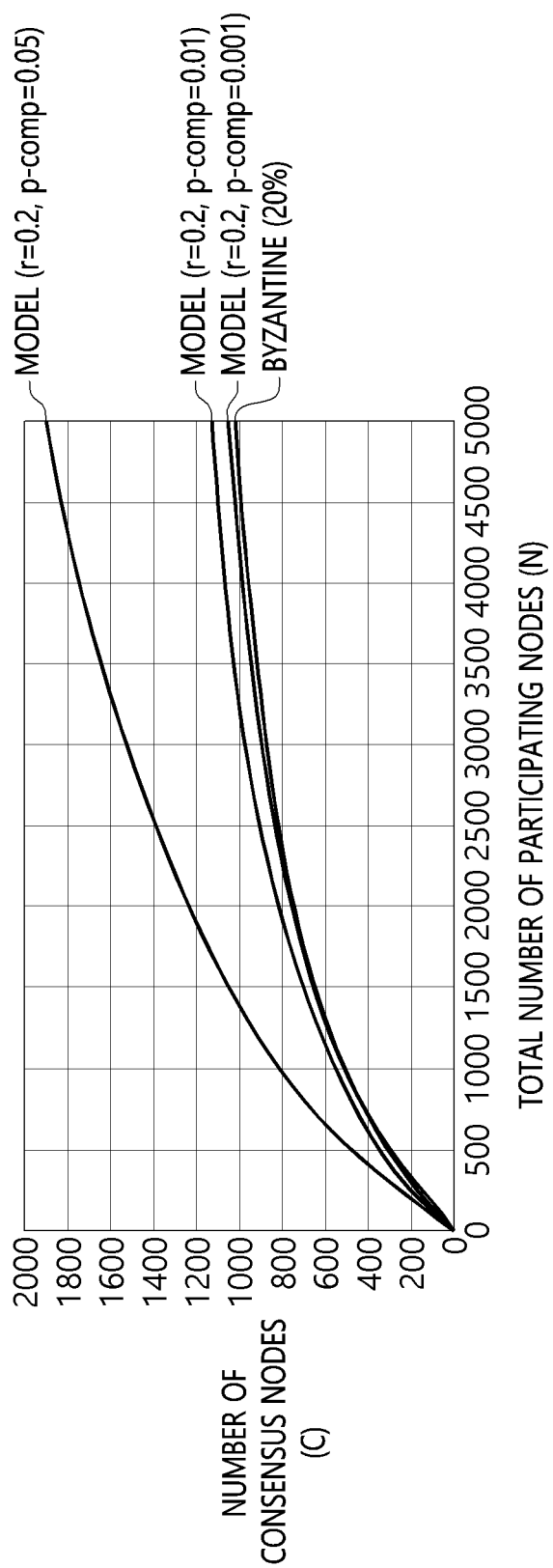
FIG. 5 is a graph illustrating a result of setting the size of a consensus congress in consideration of a fixed fraction of Byzantine nodes and a dynamic fraction of Byzantine nodes according to an embodiment of the present invention.

FIG. 5 is a graph illustrating the result of setting the size of a consensus congress in consideration of a fixed fraction of Byzantine nodes and a dynamic fraction of Byzantine nodes according to an embodiment of the present invention.

Referring to FIG. 5, the number of consensus nodes c is illustrated when the consensus nodes are selected with the probability of p, which is the probability of being selected as a consensus congress illustrated in FIG. 4, and it can be seen that the number of consensus nodes selected in a section in which the number of all participating nodes is small is increased to be adapted to the purpose of the dynamic Byzantine fraction model, compared to when a fixed fraction of Byzantine nodes is used.

Figure 6:
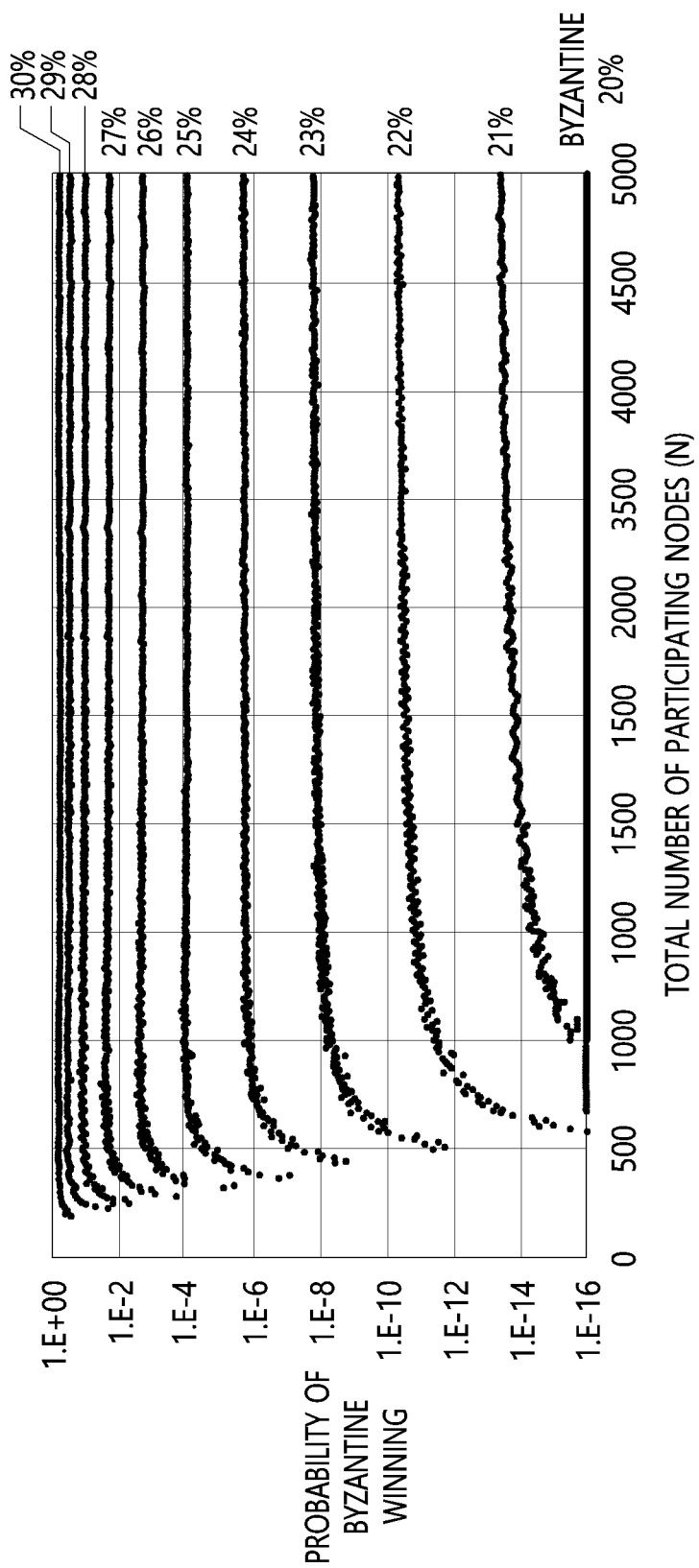
FIG. 6 is a graph illustrating a result of calculating the probability of Byzantine winning based on a dynamic fraction of Byzantine nodes according to an embodiment of the present invention.

FIG. 6 is a graph illustrating the result of calculating the probability of Byzantine winning based on a dynamic fraction of Byzantine nodes according to an embodiment of the present invention.

Referring to FIG. 6, it can be seen that the result of calculation of the probability that Byzantine wins based on the dynamic Byzantine fraction model using the simulation illustrated in FIG. 3 is illustrated.

Here, the Y-axis is plotted on a logarithmic scale, and result values that are not displayed in the section in which the total number of participating nodes, n, ranges from 0 to 500 indicate that the probability of Byzantine winning is 0%.

Even though the actual fraction of Byzantine nodes is greater than 20%, the probability of Byzantine winning may be controlled so that the probability in the case where the total number of participating is small is equal or less than that in the case where the total number of participating nodes is large, unlike the case of FIG. 3.

Consequently, the method proposed by the present invention has an effect of finding an agreement in the trade-off between the size of a consensus congress and the probability of Byzantine winning in order to operate a blockchain in the practical environment.

Figure 7:
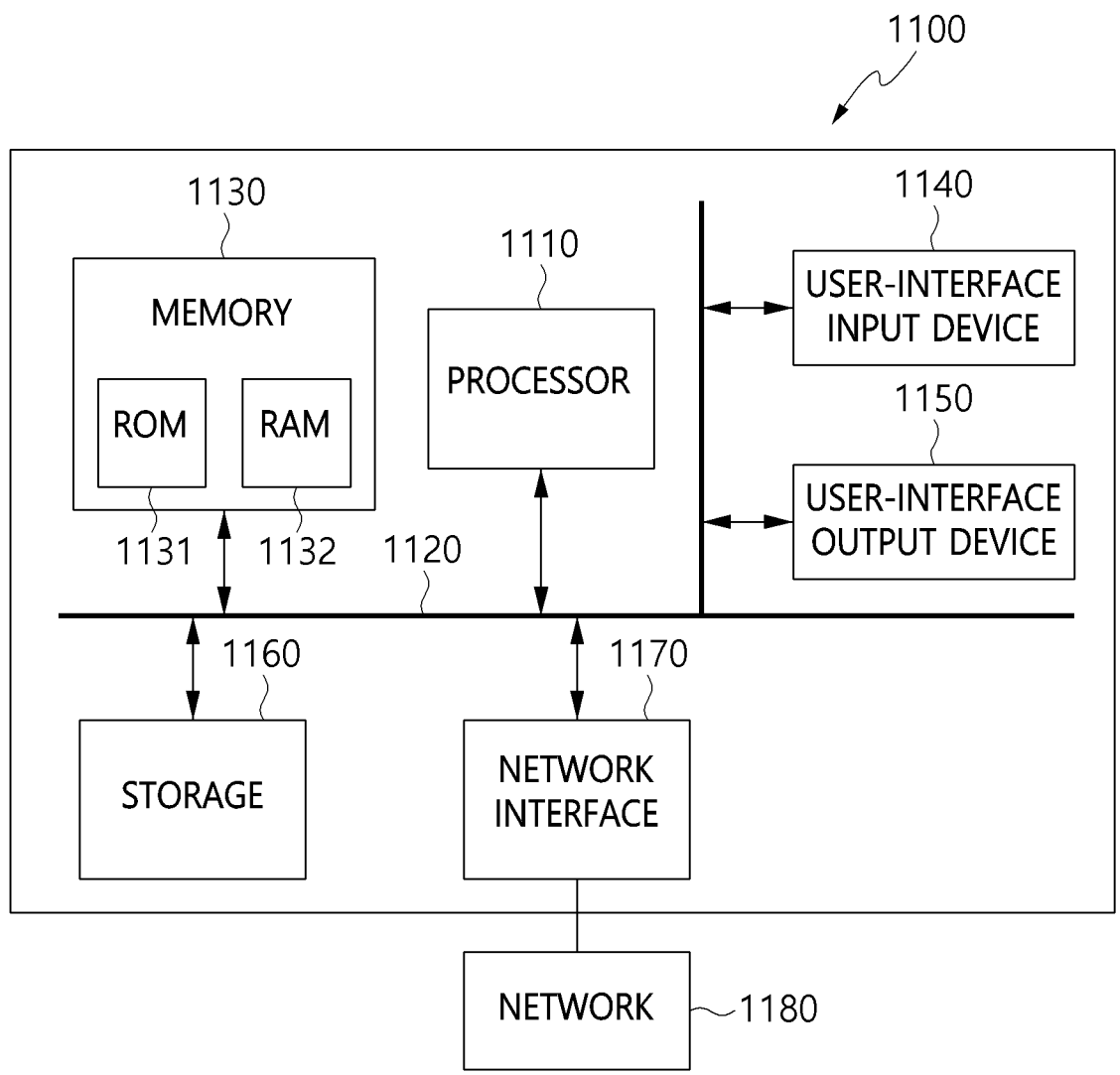
FIG. 7 is a view illustrating a computer system according to an embodiment of the present invention.

FIG. 7 is a view illustrating a computer system according to an embodiment of the present invention.

Referring to FIG. 7, a distributed consensus apparatus and respective nodes in a dynamic Byzantine fraction environment according to an embodiment of the present invention may be implemented in a computer system 1100 including a computer-readable recording medium. As illustrated in FIG. 7, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The distributed consensus apparatus in a dynamic Byzantine fraction environment according to an embodiment of the present invention includes one or more processors 1110 and executable memory 1130 for storing at least one program executed by the one or more processors 1110. The at least one program receives delegate request messages including a first transaction for requesting distributed consensus proposed by a client from consensus candidate nodes of a blockchain, selects consensus candidate nodes corresponding to a consensus quorum, among the consensus candidate nodes, as consensus nodes based on the delegate request messages, generates a prepare message including a second transaction for obtaining agreement from the consensus nodes, sends the prepare message to the consensus nodes, receives commit messages including digital signatures of the respective consensus nodes from the consensus nodes as a reply to the prepare message, and completes the distributed consensus by broadcasting a reply message, which is the result of verification of the digital signatures included in the commit messages, to the consensus candidate nodes. Also, the at least one program calculates a stochastic variable for the probability that a preset fraction of Byzantine nodes is changed using the probability that at least one of the consensus candidate nodes corresponding to the consensus quorum is changed to a Byzantine node, the consensus quorum is 2f+1 (f being an integer equal to or greater than 1), f satisfies a first condition and a second condition, the first condition is a condition that is satisfied when a first probability, which is the probability that the number of Byzantine nodes to be selected as the consensus candidate nodes is greater than f when the consensus candidate nodes are selected from among all of the nodes in the blockchain using the stochastic variable, is equal to or less than a preset first reference probability, and the second condition is a condition that is satisfied when a second probability, which is the probability that the number of consensus candidate nodes is equal to or less than 3f, is equal to or less than a preset second reference probability.

Here, the fraction of Byzantine nodes is preset to 0.2 as the default value thereof, and the default value may change in the range of real numbers equal to or greater than 0.2 and equal to or less than 0.33 depending on the probability that at least one of the consensus candidate nodes corresponding to the preset consensus quorum is changed to a Byzantine node.

Here, the stochastic variable may be calculated for each range of the changing fraction of Byzantine nodes in consideration of the total number of consensus candidate nodes.

Here, the at least one program may generate a dynamic Byzantine node fraction model for modeling the fraction of Byzantine nodes based on the stochastic variable.

Here, the first reference probability may be set in consideration of the probability that at least one of the consensus candidate nodes corresponding to the consensus quorum is changed to a Byzantine node.

The present invention may minimize the size of a consensus congress selected in a decentralized manner and guarantee the required Byzantine fault tolerance when a fraction of Byzantine nodes is dynamically changed.

Also, the present invention may find a practical agreement for operating a blockchain in the trade-off relationship between the size of a consensus congress and the probability of Byzantine winning.

As described above, the apparatus and method for distributed consensus in a dynamic Byzantine fraction environment according to the present invention are not limitedly applied to the configurations and operations of the above-described embodiments, but all or some of the embodiments may be selectively combined and configured, so the embodiments may be modified in various ways.

What is claimed is:

1. An apparatus for distributed consensus in a dynamic Byzantine fraction environment, comprising:
one or more processors; and
executable memory for storing at least one program executed by the one or more processors,
wherein:
the at least one program is configured to
receive delegate request messages including a first transaction for requesting distributed consensus proposed by a client from consensus candidate nodes of a blockchain and select consensus candidate nodes corresponding to a preset consensus quorum, among the consensus candidate nodes, as consensus nodes based on the delegate request messages,
generate a prepare message including a second transaction for obtaining agreement from the consensus nodes and send the prepare message to the consensus nodes, and
receive commit messages including digital signatures of the respective consensus nodes from the consensus nodes as a reply to the prepare message and complete the distributed consensus by broadcasting a reply message, which is a result of verification of the digital signatures included in the commit messages, to the consensus candidate nodes,
the at least one program calculates a stochastic variable for a probability that a preset fraction of Byzantine nodes is changed using a probability that at least one of the consensus candidate nodes corresponding to the preset consensus quorum is changed to a Byzantine node,
the consensus quorum is 2f+1 (f being an integer equal to or greater than 1),
f satisfies a first condition and a second condition,
the first condition is a condition that is satisfied when a first probability, which is a probability that a number of Byzantine nodes to be selected as the consensus candidate nodes is greater than f when the consensus candidate nodes are selected from among all of nodes in the blockchain using the stochastic variable, is equal to or less than a preset first reference probability, and
the second condition is a condition that is satisfied when a second probability, which is a probability that a number of consensus candidate nodes is equal to or less than 3f, is equal to or less than a preset second reference probability.

2. The apparatus of claim 1, wherein the fraction of Byzantine nodes is preset to 0.2 as a default value thereof, and the default value is changed to a changed fraction in a range of real numbers equal to or greater than 0.2 and equal to or less than 0.33 depending on the probability that at least one of the consensus candidate nodes corresponding to the preset consensus quorum is changed to a Byzantine node.

3. The apparatus of claim 2, wherein the stochastic variable is calculated for each range of the changed fraction of Byzantine nodes in consideration of a total number of consensus candidate nodes.

4. The apparatus of claim 1, wherein the at least one program generates a dynamic Byzantine node fraction model for modeling the fraction of Byzantine nodes based on the stochastic variable.

5. The apparatus of claim 1, wherein the first reference probability is set in consideration of the probability that at least one of the consensus candidate nodes corresponding to the consensus quorum is changed to a Byzantine node.

6. A method for distributed consensus in a dynamic Byzantine fraction environment, performed by a distributed consensus apparatus in the dynamic Byzantine fraction environment, comprising:
receiving delegate request messages including a first transaction for requesting distributed consensus proposed by a client from consensus candidate nodes of a blockchain and selecting consensus candidate nodes corresponding to a preset consensus quorum, among the consensus candidate nodes, as consensus nodes based on the delegate request messages;
generating a prepare message including a second transaction for obtaining agreement from the consensus nodes and sending the prepare message to the consensus nodes; and
receiving commit messages including digital signatures of the respective consensus nodes from the consensus nodes as a reply to the prepare message and completing the distributed consensus by broadcasting a reply message, which is a result of verification of the digital signatures included in the commit messages, to the consensus candidate nodes,
wherein:
selecting the consensus candidate nodes corresponding to the consensus quorum comprises calculating a stochastic variable for a probability that a preset fraction of Byzantine nodes is changed using a probability that at least one of the consensus candidate nodes corresponding to the preset consensus quorum is changed to a Byzantine node,
the consensus quorum is 2f+1 (f being an integer equal to or greater than 1),
f satisfies a first condition and a second condition,
the first condition is a condition that is satisfied when a first probability, which is a probability that a number of Byzantine nodes to be selected as the consensus candidate nodes is greater than f when the consensus candidate nodes are selected from among all of nodes in the blockchain using the stochastic variable, is equal to or less than a preset first reference probability, and
the second condition is a condition that is satisfied when a second probability, which is a probability that a number of consensus candidate nodes is equal to or less than 3f, is equal to or less than a preset second reference probability.

7. The method of claim 6, wherein the fraction of Byzantine nodes is preset to 0.2 as a default value thereof, and the default value is changed to a changed fraction in a range of real numbers equal to or greater than 0.2 and equal to or less than 0.33 depending on the probability that at least one of the consensus candidate nodes corresponding to the preset consensus quorum is changed to a Byzantine node.

8. The method of claim 7, wherein the stochastic variable is calculated for each range of the changed fraction of Byzantine nodes in consideration of a total number of consensus candidate nodes.

9. The method of claim 6, wherein selecting the consensus candidate nodes corresponding to the consensus quorum comprises generating a dynamic Byzantine node fraction model for modeling the fraction of Byzantine nodes based on the stochastic variable.

10. The method of claim 6, wherein the first reference probability is set in consideration of the probability that at least one of the consensus candidate nodes corresponding to the consensus quorum is changed to a Byzantine node.

\* \* \* \* \*